US006332477B1

(12) United States Patent
Scholl et al.

(10) Patent No.: US 6,332,477 B1
(45) Date of Patent: Dec. 25, 2001

(54) PISTON-TYPE ACCUMULATOR FOR A HYDRAULIC FLUID TO BE SUPPLIED TO A CONSUMER IN A HYDRAULIC INSTALLATION

(75) Inventors: Josef Scholl, Tholey; Herbert Baltes, Losheim, both of (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 09/601,134

(22) PCT Filed: Jun. 2, 1999

(86) PCT No.: PCT/EP99/03816

§ 371 Date: Jul. 27, 2000

§ 102(e) Date: Jul. 27, 2000

(87) PCT Pub. No.: WO99/67536

PCT Pub. Date: Dec. 29, 1999

(30) Foreign Application Priority Data

Jun. 19, 1998 (DE) ............................................. 198 27 363

(51) Int. Cl.[7] ...................................................... F16L 55/04
(52) U.S. Cl. ................................................ 138/31; 138/30
(58) Field of Search ......................................... 138/30, 31

(56) References Cited

U.S. PATENT DOCUMENTS 2,743,741 * 5/1956 Ord ....................................... 138/31
2,797,708 * 7/1957 Treseder ................................ 138/31
3,043,341 * 7/1962 Worlidge et al. ...................... 138/31
3,901,279 * 8/1975 Schnell .................................. 138/31
3,979,910 * 9/1976 Leuenberger et al. ................ 138/31
4,126,303 * 11/1978 Yanagisawa et al. .................. 138/44
4,343,477 * 8/1982 Bridges ................................. 138/31
4,457,348 * 7/1984 Mueller et al. ........................ 138/31
4,745,745 * 5/1988 Hagin .................................... 138/31
6,116,585 * 9/2000 Lutz ...................................... 138/30

FOREIGN PATENT DOCUMENTS 11 85 025 1/1965 (DE) .
11 88 247 3/1965 (DE) .
37 44 179 7/1989 (DE) .
91 13 007 12/1991 (DE) .
1 297 881 11/1962 (FR) .

* cited by examiner

*Primary Examiner*—James Hook
(74) *Attorney, Agent, or Firm*—Roylance, Abrams, Berdo & Goodman, L.L.P.

(57) ABSTRACT

A piston accumulator can be used for hydraulically actuating the discharge unit in non-automotive bulk commodity vehicles. The accumulator cylinder has a tappet which can be axially displaced within the cylinder. When a defined load pressure is reached in the oil chamber of the cylinder, the tappet can be displaced by a piston to actuate a control valve. The valve serves as shut-off device for the loading fluid stream flowing to the oil chamber and is positioned as a detachable module on the exterior face of cylinder cover in such a way that it can be actuated by the outer end of the tappet. The tappet is guided towards the outside by passing in a sealed manner through the cylinder cover.

20 Claims, 2 Drawing Sheets

PISTON-TYPE ACCUMULATOR FOR A HYDRAULIC FLUID TO BE SUPPLIED TO A CONSUMER IN A HYDRAULIC INSTALLATION

FIELD OF THE INVENTION

The present invention relates to a piston-type accumulator for a hydraulic fluid to be supplied to a consumer in a hydraulic installation, especially for hydraulic actuation of the discharge unit in the case of non-automotive vehicles for bulk commodities. A piston is mounted movably in a cylinder, dividing the cylinder into an oil chamber and a gas chamber. Connections are provided on the oil chamber for the supply of the loading fluid stream and discharge of the working fluid stream. An axially movable tappet is in the cylinder, cooperates with the piston with its inner end, and is guided with its outer end in the cylinder cover limiting the gas chamber. A control valve serves as shut-off device for the loading fluid stream, can be actuated by a bypassing conduit. The bypassing circuit is optionally connected or disconnected, for bridging of the piston-type accumulator with the connection for the loading fluid stream connected to the oil chamber. The outer end of the tappet is guided in a sealed manner through the cylinder cover to the outside, is accessible on the external surface of the cylinder as an operating member for the control valve, and forms a structural unit which can be mounted detachably on the outside of the cylinder cover.

BACKGROUND OF THE INVENTION

DE 91 13 007 U1 discloses a piston-type accumulator for the actuation of the bulk material discharge device in railway cars. The hydraulic installation provided for such railway cars has at least one hydraulic pump driven by an additional driving wheel set arrangement, which pumps a loading fluid stream into the piston-type accumulator during movement of the railway car. If the adjusted operation pressure is then attained in the accumulator in this manner, the shut-off device causes the loading fluid stream to be reversed in direction to pass through the bypassing conduit without pressure to the reservoir connection of the hydraulic installation. Therefore, the stream flows back into the fluid storage container.

With that piston-type accumulator, the combination of the traditional pressure accumulator and the shut-off device for the loading fluid stream with the required associated operating device leads to a costly structure, producing excessively high manufacturing and maintenance costs. The plurality of structural component parts which are movable relative to one another increases the wear on parts.

DE-A-1 185 025 discloses a piston-type accumulator for the actuation of the bulk commodities discharge device on railway cars. The hydraulic installation provided with such railway cars has at least one hydraulic pump powered by an additional set of wheels. The pump pumps a loading fluid stream into the piston-type accumulator during the movement of the railway car. If the adjusted operation pressure is then attained in the accumulator in this manner, the shut-off device causes the loading fluid stream to be reversed through the bypassing conduit without pressure to the reservoir connection of the hydraulic installation and to flow in reverse into the fluid storage reservoir.

SUMMARY OF THE INVENTION

Objects of the present invention are to provide a piston-type accumulator having a compact structure and a particularly favorable operational behavior.

In the case of a piston-type accumulator, the objects are attained according to the present invention by the inner end of the tappet, provided for cooperation with the piston, being guided longitudinally slidably in a traverse found in the gas chamber and fastened to the inner wall of the cylinder.

This inner guiding arrangement allows for the development of the part of the cylinder defining the gas chamber to a considerable structural length, providing considerable volume in the gas chamber within the piston-type accumulator as compared with the lifting volume of the piston in the oil chamber. This arrangement is particularly advantageous in that the pressure differential, despite the compact structure of the accumulator, is generated over the entire working or power stroke of the piston and remains quite small. Favorably, safe operation of the hydraulic installation is provided, including the special case of the bulk commodity discharge device.

Other objects, advantages and salient features of the present invention will become apparent form the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
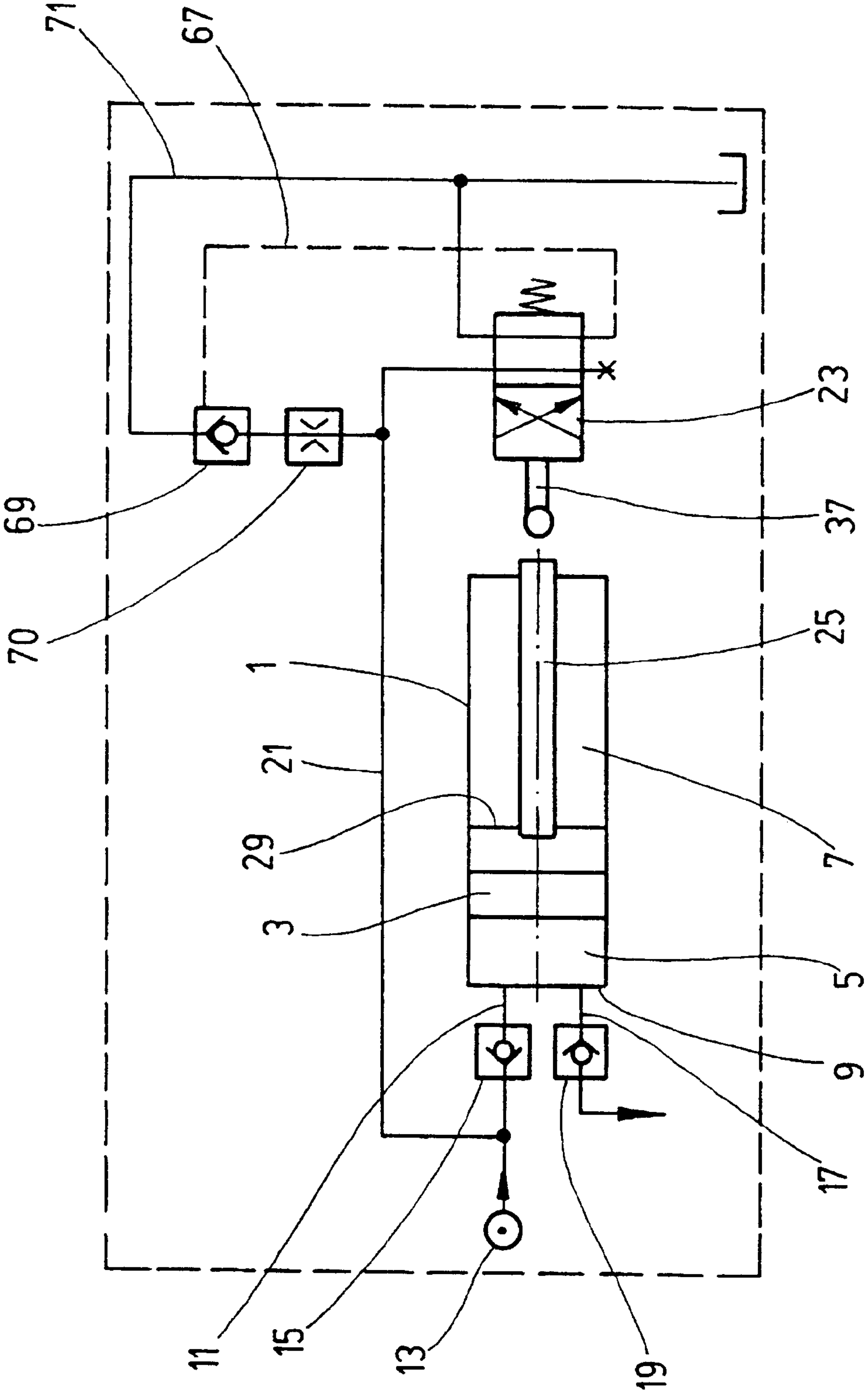
FIG. 1 is a schematic block diagram of a piston-type accumulator with an associated hydraulic circuit according to an embodiment of the present invention.

In the block diagram representation of FIG. 1, the cylinder 1 of a piston-type accumulator has an inner chamber subdivided by a movably mounted separator piston 3 arranged in the cylinder. The cylinder is subdivided into an oil chamber 5 and a gas chamber 7.

Figure 2:
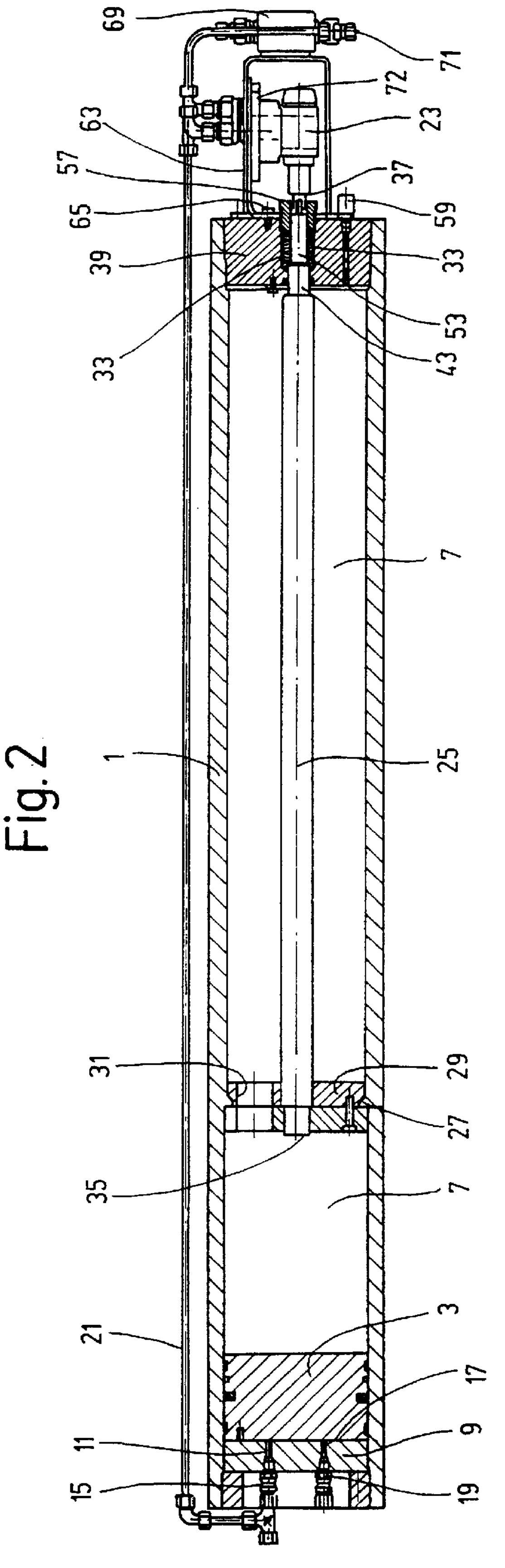
FIG. 2 is a side elevational view in section of the piston-type accumulator of FIG. 1.

FIG. 2 shows piston 3 in its final position engaging cylinder base 9, which position corresponds to the operational state in which oil chamber 5 is not being loaded by a loading fluid stream being fed in. The volume of the oil chamber 5 is reduced in practical terms to an inconsequential amount under the influence of the compressed gas found in gas chamber 7, by displacement of piston 3. In this particular example, the gas is $N_2$.

For supply of the loading fluid stream to the oil chamber 5, cylinder base 9 has a connection 11. Hydraulic fluid can be supplied to connection 11 from the associated hydraulic pump 13 through a check valve 15. A second connection 17 on cylinder base 9 permits discharge of the working fluid stream through a check valve 19 to the relevant consumer. In the aforementioned special case, the consumer is the working cylinder of the associated bulk commodity discharge device. A bypassing conduit 21 is connected through check valve 15 with the connection 11 and to oil chamber 5 and forms a bridging of the piston-type accumulator for the loading fluid stream. A control valve 23, connected with conduit 21, cooperates with the check valve 69 to provide a shut-off device for the loading fluid stream.

A tappet 25 in the form of a round or cylindrical rod of considerable length is axially slidable longitudinally in cylinder 1 as the operating member for control valve 23. A separation wall 29, fastened to a fin 27 on the inner wall of cylinder 1, has a gas passage 31 adjacent the inner terminal area of tappet 25 and forms a guide for its axial movement. Tappet 25 is pre-biased by the spring force of a spring assembly, which in the case of the shown exemplary embodiment is formed by a set of disk springs 33 (see particularly FIG. 3), to reach its thrust-in final displacement position against separator piston 3. As shown in FIG. 2, in its trust-in final displacement position, tappet 25 springs forward with its relevant or inner end 35 extending through separation wall 29 and outwardly for a certain distance adapted to the operation path of the setting and adjusting member 37 effecting control valve 23. Separation wall 29 forms a mechanical buffer limiting the lift movement of separator piston 3 caused by the loading fluid stream. Installation of separation wall 29, in cooperation with the end 35 of tappet 25, displaces the tappet counter to the spring force of the set of disk springs 33 for operation of check valve 23, shown on the right in FIG. 2.

Figure 3:
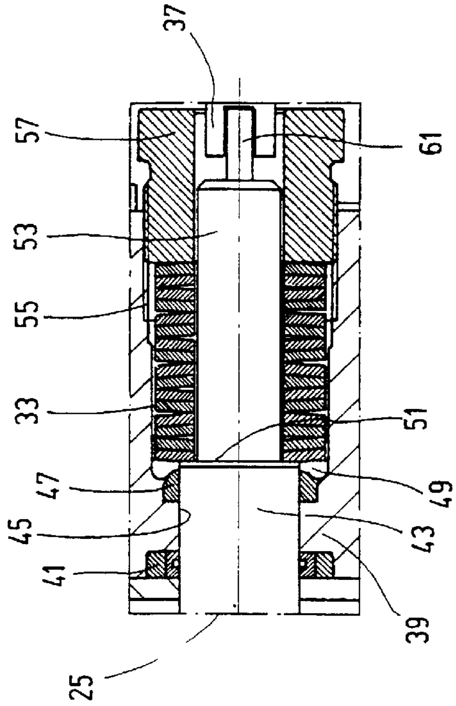
FIG. 3 is an enlarged, partial side elevational view in section of the cylinder cover and its components of the piston-type accumulator of FIG. 2.

As shown in FIGS. 2 and 3, the outer end of tappet 25 extends away from separation wall 29 through a cylinder cover 39 screwed into the relevant end of cylinder 1 for shutting-off gas chamber 7. A sealing arrangement 41 forms a seal in the bore 45 of cylinder cover 39 and cooperates with a tapered segment 43 of tappet 25. Tapered segment 43 extends through a pollutant deflector 47 into a widened out area 49 of bore 45. With formation of a shoulder surface 51, tappet 25 extends into a still further tapered diameter, at the end becoming shaft part 53. Widened out part 49 receives the set of disk springs 33 surrounding shaft part 53. The set of disk springs is supported on the one hand on shoulder surface 51 of tappet 25 and on the other hand on a threaded sheathing 57 screwed into a terminal interior threading 55 of the widened out part 49 of the bore. A filling valve 59 for supplying hydraulic gas to gas chamber 7 is shown only in FIG. 2.

As shown particularly in FIG. 3, the end of shaft part 53 of tappet 25 forms a coupling member 61 for articulated connection with setting and adjusting member 37 of control valve 23. In the embodiment shown, control valve 23 is a commercially available multi-way valve of the Schieber type, which can be simply screwed on and off as a detachable structural component part of a base plate 72. Base plate 72 is connected by means of a holder frame 63 and a screw arrangement 65 with cylinder cover 30.

As shown in FIG. 1, bypassing conduit 21 is connected with control valve 23. During operation when tappet 25 displaces setting and adjusting member 37 counter to the working spring force and to the right in the drawing, the control valve switches the loading pressure from oil chamber 5 being generated in conduit 21 to a control line 67. As a result of the pressure in control line 67, a hydraulically opening check valve 69 connected therewith is opened. Check valve 69 is connected in such a manner that in its opened state it releases a fluid connection through a pressure-regulating valve 70, connected in series with it, from bypassing conduit 21 to reservoir connection 71.

When a predetermined loading pressure is attained in oil chamber 5, piston 3 acts upon tappet 25 and displaces it counter to the effective spring force for actuation of control valve 23 and correspondingly connects this through or extends the loading pressure being generated in bypassing conduit 21 to control line 67. The discharge without pressure occurs through the unlocked check valve 69 and the series-connected pressure-regulating valve 70, so that the piston-type accumulator is bridged hydraulically. Because of the pre-biasing spring force working on control valve 23 and tappet 25, in the case of a drop of the loading pressure in oil chamber 5, causing piston 3 to move from the end 35 of tappet 25, control valve 23 returns to its other connected state, in which the connection connecting with conduit 21 is blocked and control line 67 is connected with reservoir connection 71, in other words is without pressure. Thus, check valve 69 is no longer opened, and the bridging of the piston-type accumulator through bypassing conduit 21 is eliminated, so that the loading fluid stream for the loading of the piston-type accumulator can become effective once again.

While an embodiment has been chosen to illustrate the invention, it will be understood by those skilled in the art that various changes and modifications can be made therein without departing from the scope of the invention as defined in the appended claims.

What is claimed is:

1. A piston accumulator for hydraulic fluid to be supplied to a consumer in a hydraulic installation, comprising:

a cylinder having an oil chamber, a gas chamber and a cylinder cover defining one end of said gas chamber;

a piston mounted in said cylinder to divide said cylinder into said oil chamber and said gas chamber;

inlet and outlet connections on said cylinder for supplying and discharging pressurized hydraulic oil to and from said oil chamber, respectively;

an axially movable tappet in said cylinder having an inner end cooperating with said piston and an outer end guided in said cylinder cover and accessible outside said cylinder;

a control valve controlling fluid pressure flow into said oil chamber and being connected to said inlet connection through a bypassing conduit, said control valve being engageable with and actualable by said outer end of said tappet, said control valve being mounted detachably on an exterior of said cylinder cover; and a transverse fastened to an inner wall of said cylinder in said gas chamber, said inner end of said tappet being guided for longitudinal sliding movement in said transverse for cooperation with said piston, said traverse having at least one gas passage therein.

2. A piston accumulator according to claim 1 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

3. A piston accumulator according to claim 1 wherein said traverse comprises a separation wall forming a buffer limiting movement of said piston; and said tappet is spring biased such that said inner end of said tappet projects through said separation wall a certain distance when said piston is spaced from said buffer and such that said tappet can be displaced counter to spring biasing by movement of said piston to said buffer, said distance corresponding to an operating path length of said control valve.

4. A piston accumulator according to claim 3 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

5. A piston accumulator according to claim 3 wherein said control valve comprises a multi-way valve.

6. A piston accumulator according to claim 5 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

7. A piston accumulator according to claim 3 wherein a set of disk springs biases said tappet, said set of disk springs being housed in a terminal widened out area of a bore in said cylinder cover receiving said tappet.

8. A piston accumulator according to claim 7 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

9. A piston accumulator according to claim 7 wherein said control valve comprises a multi-way valve.

10. A piston accumulator according to claim 9 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

11. A piston accumulator according to claim 7 wherein said tappet comprises a tapered shaft part at said outer end forming a shoulder surface that extends into said widened out area of said bore and extending through said set of disk springs, said set of disk springs being supported on said shoulder surface at one end thereof and on a sheathing threaded into said widened out area at an opposite end of said set of disk springs.

12. A piston accumulator according to claim 11 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

13. A piston accumulator according to claim 11 wherein said control valve comprises a multi-way valve.

14. A piston accumulator according to claim 13 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

15. A piston accumulator according to claim 11 wherein said outer end of said tappet comprises a coupling member; and said control valve comprises a movable setting and adjusting member connectable with said coupling member to affect said control valve.

16. A piston accumulator according to claim 15 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

17. A piston accumulator according to claim 15 wherein said control valve comprises a multi-way valve.

18. A piston accumulator according to claim 17 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

19. A piston accumulator according to claim 1 wherein said control valve comprises a multi-way valve.

20. A piston accumulator according to claim 19 wherein a fluid connection connects a said bypassing conduit with a reservoir connection of the hydraulic installation for terminating supply of the pressurized hydraulic oil to said oil chamber, and comprises a hydraulically operated check valve and a pressure regulating valve connected in series, said check valve being controlled by fluid pressure from said control valve.

* * * * *